United States Patent [19]

Garcia, deceased

[11] Patent Number: 4,517,862

[45] Date of Patent: May 21, 1985

[54] WHEEL ALIGNMENT TOOL

[75] Inventor: Moises R. Garcia, deceased, late of Dona Ana, N. Mex., by Teresa A. Garcia, personal representative

[73] Assignee: The United States of America as represented by the Secretary of the Army, Washington, D.C.

[21] Appl. No.: 572,492

[22] Filed: Jan. 20, 1984

[51] Int. Cl.³ .............................................. B25B 13/02
[52] U.S. Cl. ........................................ 81/119; 81/437; 81/125; 81/178.1
[58] Field of Search ................... 81/119, 90 B, 177 A, 81/177 R, 177 D, 180 R, 437, 125; 7/100, 138, 165, 170; D8/105, 21, 26–28

[56] References Cited

U.S. PATENT DOCUMENTS

| 341,117 | 5/1886 | Wright | 7/138 |
| 1,001,530 | 8/1911 | Kaesen | 7/138 X |
| 1,784,535 | 12/1930 | Osterby | 7/138 |
| 3,276,299 | 10/1966 | Halburian | 81/437 X |
| 3,721,137 | 3/1973 | Mosher | 81/90 B |

FOREIGN PATENT DOCUMENTS 542195 12/1941 United Kingdom ................. 81/119

Primary Examiner—Frederick R. Schmidt
Assistant Examiner—Debra S. Meislin
Attorney, Agent, or Firm—Anthony T. Lane; Robert P. Gibson; Saul Elbaum

[57] ABSTRACT

This multi purpose hand tool comprises a pair of double ended wrenches each with an open-ended wrench at one end and a box wrench at the other end. The shanks of each wrench are preferably of circular cross section and each has a different sliding tool thereon. One of these sliding tools includes a hook adapted to engage the tie rod adjusting sleeves of automobiles to facilitate the adjustment thereof. The other sliding tool comprises an offset screwdriver with an adjustable lever arm. The wrenches can be attached to each other for safekeeping by means of a square stud on one of the sliding tools and a mating hole on the other sliding tool. The tool is designed for fast and accurate adjustment of automotive front ends.

6 Claims, 4 Drawing Figures

WHEEL ALIGNMENT TOOL

RIGHTS OF THE GOVERNMENT

The invention described herein may be manufactured, used and licensed by or for the United States Government without the payment to me of any royalty thereon.

BACKGROUND OF THE INVENTION

This invention relates to a multi-purpose hand tool and more particularly to a tool of this type which is adapted primarily to permit fast and accurate adjustment of the front ends of motor vehicles. Virtually all vehicles include as part of the steering mechanism a tie rod which extends across the front end of the vehicle to connect the steering mechanism of the front wheels. The tie rod includes an adjusting sleeve which functions like a turnbuckle to adjust the tie rod length to achieve the proper toe-in of the front wheels. The present invention provides a tool especially designed to facilitate the adjustment of these tie rod adjusting sleeves and other adjustments of the front ends of vehicles.

SUMMARY OF THE INVENTION

The novel special purpose tool comprises a pair of double ended wrenches each with an open-ended wrench at one end and with a box wrench at the other end. The shanks of each of the wrenches are preferably of circular cross section and each has a different sliding tool thereon. One of these sliding tools includes a hook adapted to engage the grooves in the tie rod adjusting sleeve to facilitate rotation thereof. The opposite side of this sliding tool may comprise a square drive shank which can be used to drive a socket wrench, or it can be inserted into a mating hole in the sliding tool of the other wrench to prevent the two wrenches from becoming separated during non-use. In addition to the aforementioned hole, the sliding portion of the other wrench includes a screwdriver blade. Thus the other wrench can also function as an offset screwdriver with an adjustable lever arm.

It is thus an object of the invention to provide a hand tool with seven different features adapted to quickly and easily adjust the adjustment sleeve of vehicular tie rods and other portions of vehicular front ends and steering mechanisms.

Another object of the invention is to provide a multi-purpose tool comprising a pair of double-ended wrenches each with slidable tools on the shanks thereof, one of such slidable tools comprising a hook adapted to turn the adjusting sleeves of automotive tie rods and the slidable tool of the other wrench comprising an offset screwdriver.

A still further object of the invention is to provide a multipurpose tool including open ended and box wrenches, a hook and an offset screwdriver, both with adjustable lever arms, as well as a drive shank for a socket wrench.

These and other objects and advantages of the invention will become apparent from the following detailed description and the drawings.

DETAILED DESCRIPTION OF A PREFERRED EMBODIMENT

Figure 1:
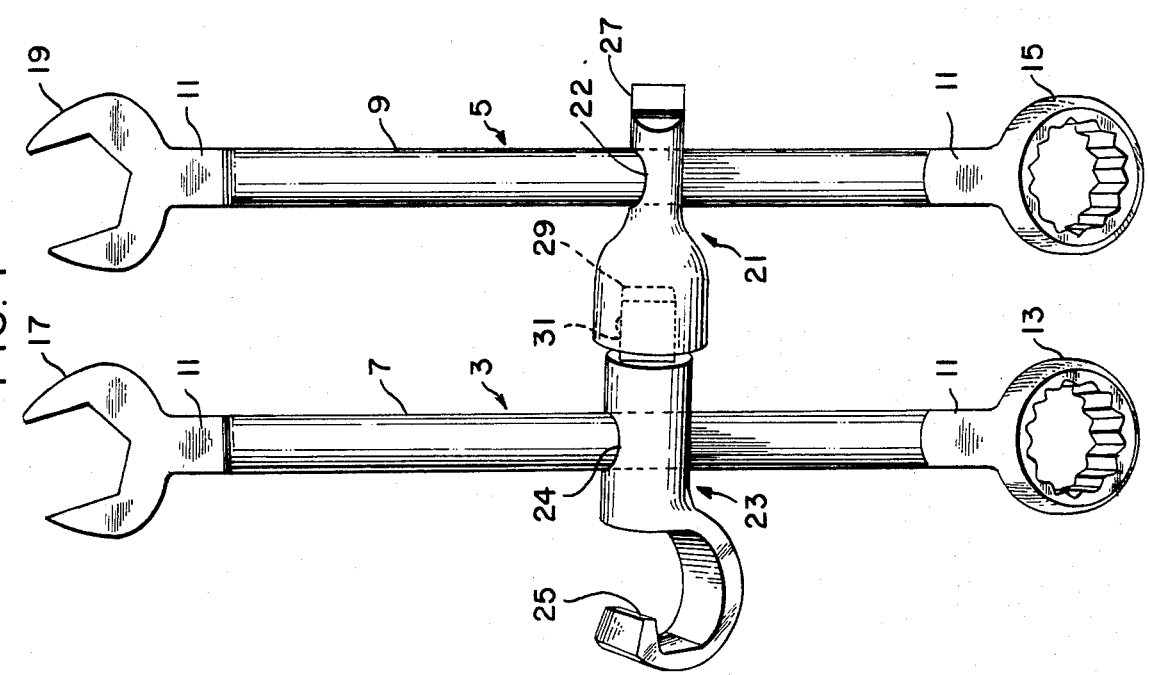
FIG. 1 shows the two wrenches attached to each other.

FIG. 1 shows the two parts of the tool attached to each other so that they do not become separated during non-use. The shank of the first wrench 3 is indicated by numeral 7 and the second wrench 5 comprises shank 9. Both shanks are preferably of circular cross-section over most of their lengths, but may taper to a rectangular cross-section near the ends thereof indicated at 11. The first tool 3 includes an open ended hexagonal wrench 17 at one end thereof and a hexagonal box wrench 13 at the other end thereof. The second tool 5 also includes open ended and box hexagonal wrenches 19 and 15 at either end thereof. The wrench sizes of each tool should be adapted to the size of the nuts and bolts of the vehicles with which the composite tool is to be used. For American made military vehicles it has been found useful and convenient to make one of the box wrenches ½ inch and the other box wrench 9/16, with the two open ended wrenches also ½ and 9/16 inch, with each of the tools 3 and 5 having one wrench of each size. Thus, the open ended wrench 17 of tool 3 might be ½ inch, and the box wrench 13 of the same tool 9/16 inch. The second tool 5 may have the open ended wrench 19, 9/16 inch, and the box wrench 15, ½ inch.

Tool 5 includes a slidable member 21 which includes a hole 22 adapted to fit over the cylindrical shank 9 and be slid along the shank. The member 21 includes a screwdriver blade 27 one one end thereof and a square hole 29 on the other end thereof. The slidable members 23 of tool 3 includes a circular hole 24 dimensioned to snuggly fit over cylindrical shank 7, with a square drive stud or shank 31 at one end thereof and a hook 25 at the other end. The square hole 29 and the mating stud 31 of the two slidable members can be joined to attach the composite tool together for safekeeping during non-use thereof as illustrated in FIG. 1. The square drive stud 31 is made ⅜ inches square to accommodate socket wrenches as illustrated in FIG. 2.

Figure 2:
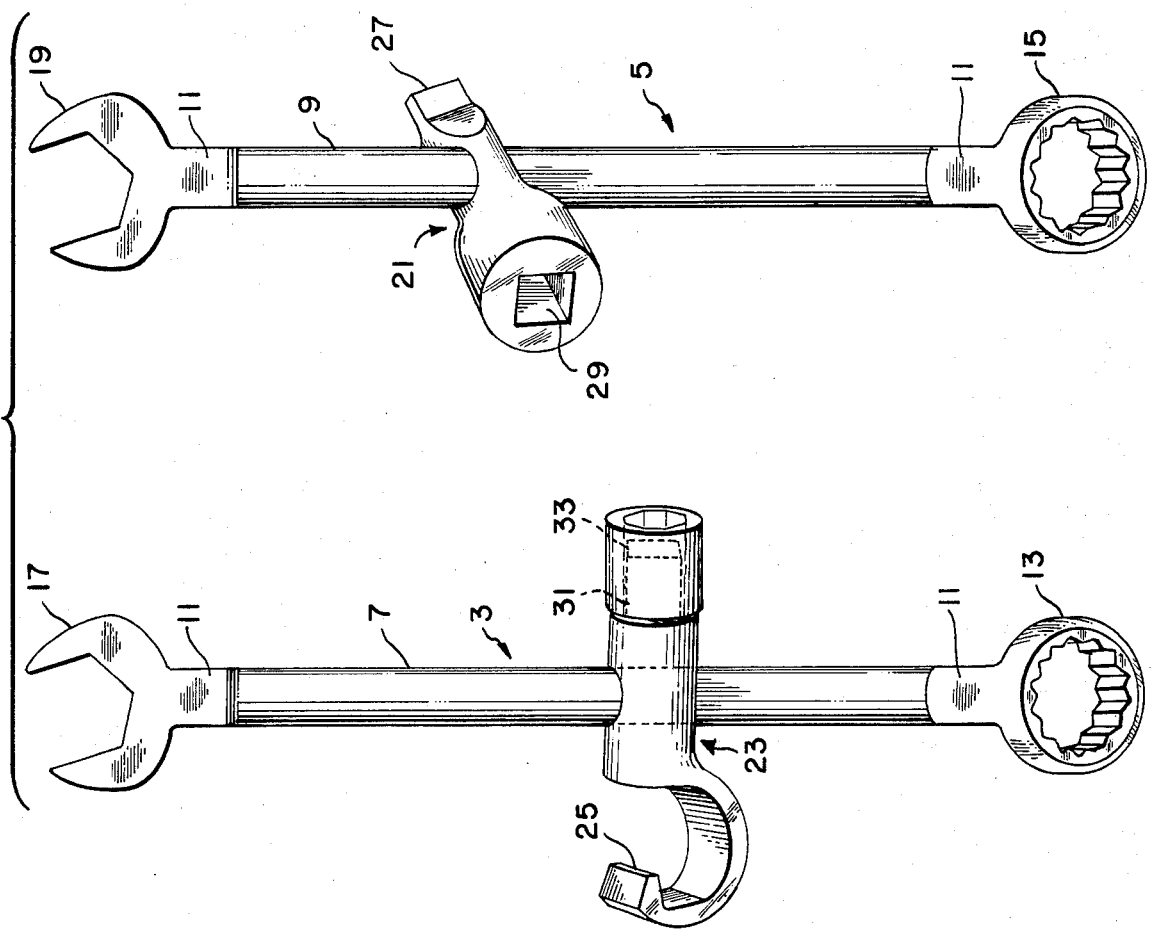
FIG. 2 shows the same wrenches separated and ready for use.

FIG. 2 shows the two parts of the composite tool separated and with a socket wrench 33 mounted on stud 31 of slidable member 23 of tool 3. The socket wrench 33 can conveniently be ⅜ inch to complement the ½ inch and 9/16 inch wrenches on the ends of the first and second tools.

The tool 3, in addition to functioning as a conventional fixed wrench comprises an offset screwdriver with an adjustable lever arm. The sliding member 21 thereof can be adjusted by sliding it along the shank to give more or less leverage to the screwdriver blade 27 or to facilitate turning the screwdriver past obstacles.

Figure 3:
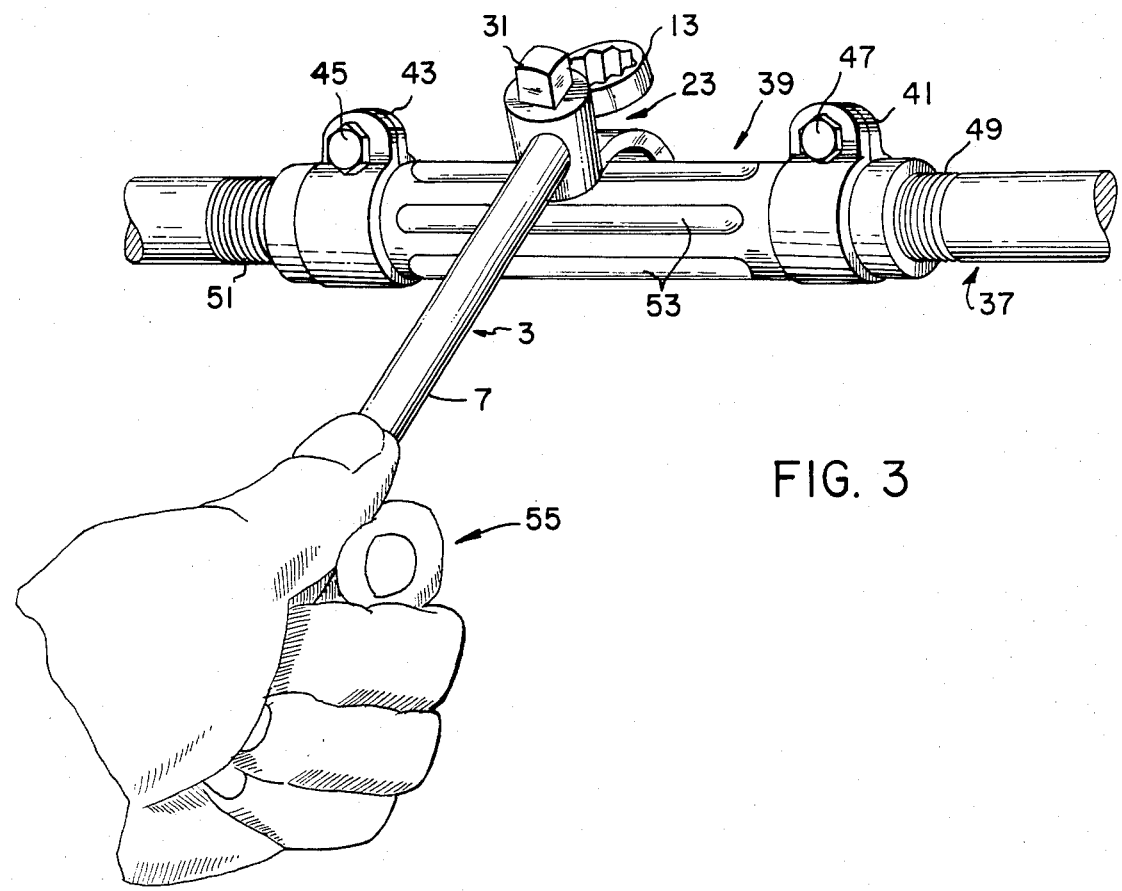
FIG. 3 shows the tool hooked onto and turning a tie rod adjusting sleeve.

FIG. 3 shows how the hook 25 on the slidable member 23 of tool 3 can be used to adjust tie rod adjusting sleeves. In this figure the tie rod 37 comprises an adjustable sleeve 39 which is screwed onto two threaded portions of the tie rod, 49 and 51, in the manner of a turnbuckle so that turning the sleeve in one direction will effectively lengthen the tie rod and turning it in the other direction will shorten it. Clamps 41 and 43 at either end of sleeve 39 are tightened by means of bolts 45 and 47 and nuts (not shown) to lock the sleeve to the tie rod once the desired adjustment is made. Grooves 53 in the sleeve 39 facilitate the turning thereof by the hooked portion on the slidable member 23 of tool 3. The bolts 45 and 47 and their associated nuts would first be loosened by using one or two of the fixed wrenches on the ends of tools 3 and 5, then the hook 25 would be applied to the sleeve as illustrated in FIG. 3 and the shank 7 pushed downward to adjust the sleeve in one of its two directions of adjustment. If it is necessary to rotate the sleeve one or more revolutions, the end of the tool 3 which has the open ended wrench 17 thereon would undoubtedly hit some portion of the vehicle's front end which is above the tie rod. If this happens, the shank 7 can be slid through the hole in slidable member 23 so that the hook is now at the other end of the tool and the turning of the sleeve can be continued with the same leverage. When the desired adjustment is attained, the clamps 41 and 43 are tightened to retain this adjustment.

Figure 4:
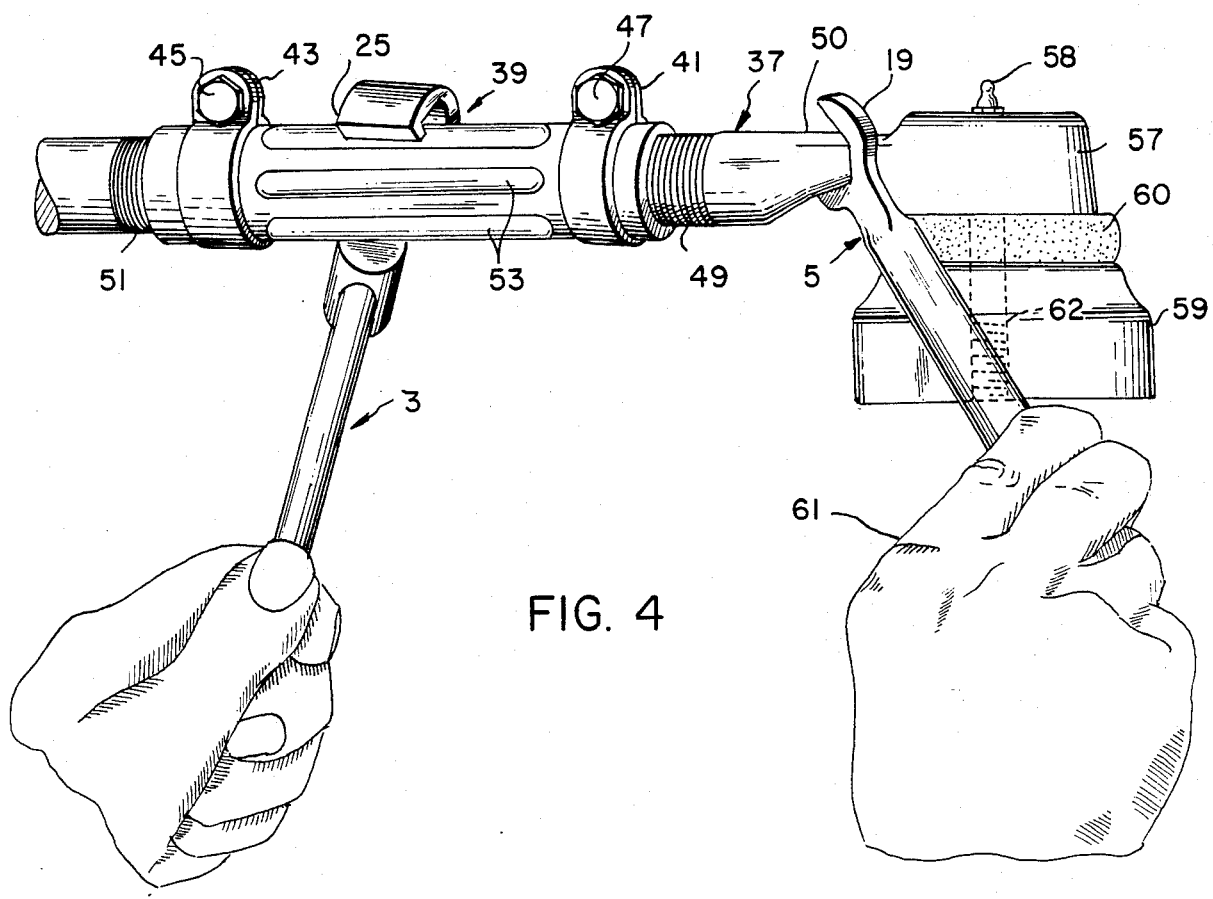
FIG. 4 shows how the two wrenches of the novel tool can be used at the same time to line up the end of a tie rod so that the rod makes proper connection to the front wheel of the vehicle.

FIG. 4 shows how both parts of this composite tool can be used to further adjust tie rods. This figure shows a tie rod 37 which is connected at its right end to the steering arm 59 of the left front wheel (not shown) of the vehicle. The steering arm is forward of the front axle and is connected to the ball joints or kingpin around which the wheel pivots during turning. The end 57 of the tie rod is generally circular with a central threaded stud 62 thereon which projects downward through a hole in the steering arm. A nut (not shown) on the end of this threaded stud holds these two parts together and permits the tie rod to rotate around the end of the steering arm during turns. Numeral 58 indicates the grease nipple and 60 the grease boot. The region 50 of the tie rod is flattened somewhat so that an open ended wrench such as 19 of the tool 5 can be applied thereto as illustrated while the hook 25 of the tool 3 is applied to the tie rod sleeve 39, to properly line up the tie rod end 57 and its stud with the steering arm 59 so that good swivel action results during turns.

If the socket wrench 33 is $\frac{5}{8}$ inch it can be used to adjust the steering gear adjusting screw lock nut, and by selecting a $\frac{3}{8}$ inch socket, the drag link in some American made vehicles can be adjusted. The offset screwdriver can also be used to adjust the drag links on some older model trucks. This tool can be adapted for foreign vehicles by making all of the wrenches metric.

I wish it to be understood that I do not desire to be limited to the exact details of construction shown and described, for obvious modifications can be made by a person skilled in the art.

I claim:

1. A special purpose composite hand tool adapted to facilitate fast and accurate adjustment of the front ends and steering mechanisms of motor vehicles, comprising: a pair of shanks, each with an open ended hexagonal wrench at one end and a hexagonal box wrench at the other end, each of said shanks having a slidable member attached thereto, one of said slidable members including on one end thereof a hook adapted to engage a groove of a tie rod adjusting sleeve to facilitate rotation thereof and on the other end thereof a square stud, the other slidable member comprising on one end thereof a screwdriver blade and on the other end thereof a square hole adapted to mate with said square stud.

2. The composite tool of claim 1 wherein said shanks are both of circular cross section and said slidable members both have circular holes therein for receiving said shanks.

3. The composite tool of claim 1 further including a socket wrench adapted to be driven by said square stud and said stud is $\frac{3}{8}$ inches square.

4. The composite tool of claim 1 in which one of said shanks has a $\frac{1}{2}$ inch open ended wrench at the one end and a 9/16 inch box wrench at the other end, while the other of said shanks has a 9/16 inch open ended wrench at the one end and a $\frac{1}{2}$ inch box wrench at the other end.

5. A multiple purpose hand tool comprising first and second tools, each of said tools comprising a shank with an open ended wrench at one end thereof and a box wrench at the other end thereof, the wrenches on each tool being of different sizes, each of said shanks having sliding members thereon, one of said sliding members including on one end thereof a hook adapted to engage a groove of a tie rod adjusting sleeves to facilitate rotation thereof and a square stud on the other end thereof, the other of said sliding members comprising a screwdriver blade on one end thereof and on the other end thereof a square hole adapted to mate with said square stud.

6. The tool of claim 5 wherein said hook is adapted to engage the grooves in tie rod adjusting sleeves and the sizes of said wrenches are selected to adjust the nuts and bolts found in the front ends and steering mechanisms of motor vehicles.

* * * * *

UNITED STATES PATENT OFFICE
CERTIFICATE OF CORRECTION

Patent No. 4,517,862  Dated May 21, 1985

Inventor(s) Moises R. Garcia, deceased, late of Doña Ana, N. Mex., by Teresa A. Garcia, personal representative It is certified that error appears in the above-identified patent and that said Letters Patent are hereby corrected as shown below:

In the Assignee section of the first page of the patent, delete "The United States of America as represented by the Secretary of the Army, Washington, D.C.".

Signed and Sealed this
Second Day of December, 1986

*Attest:*

DONALD J. QUIGG

*Attesting Officer*  *Commissioner of Patents and Trademarks*